US012567666B2

(12) United States Patent
Miao

(10) Patent No.: US 12,567,666 B2
(45) Date of Patent: Mar. 3, 2026

(54) SIGNAL-RADIATION DEVICE UTILIZING METAL PORTION OF CONNECTION PORT AS WIRELESS ANTENNA AND EQUIPMENT THEREOF

(71) Applicant: JIN TAY INDUSTRIES CO., LTD., New Taipei (TW)

(72) Inventor: Tony Miao, New Taipei (TW)

(73) Assignee: JIN TAY INDUSTRIES CO., LTD., New Taipei (TW)

( * ) Notice: Subject to any disclaimer, the term of this patent is extended or adjusted under 35 U.S.C. 154(b) by 394 days.

(21) Appl. No.: 18/451,062

(22) Filed: Aug. 16, 2023

(65) Prior Publication Data

US 2024/0154305 A1 May 9, 2024

(30) Foreign Application Priority Data

Nov. 4, 2022 (CN) ......................... 202211375314.0
Nov. 29, 2022 (TW) ................................ 111213168

(51) Int. Cl.
*H01Q 5/10* (2015.01)
*H01Q 1/22* (2006.01)
*H01Q 1/44* (2006.01)
*H01Q 1/52* (2006.01)

(52) U.S. Cl.
CPC ................ *H01Q 5/10* (2015.01); *H01Q 1/52* (2013.01)

(58) Field of Classification Search
None
See application file for complete search history.

(56) References Cited

U.S. PATENT DOCUMENTS

2014/0266922 A1* 9/2014 Jin ......................... H01Q 1/243 343/702
2018/0026346 A1* 1/2018 Lee .......................... H01Q 5/10 455/575.7
2018/0375209 A1* 12/2018 Su ........................... H01Q 1/44
2020/0251826 A1* 8/2020 Onaka ...................... H01Q 9/40

FOREIGN PATENT DOCUMENTS

CN 112002993 A * 11/2020 ............ H01Q 5/335
TW 201036254 A1 * 10/2010
TW I396330 B1 5/2013
WO WO-2021045241 A1 * 3/2021 ............... H01Q 1/52
WO WO-2021086394 A1 * 5/2021 ........... H01Q 13/103

* cited by examiner

*Primary Examiner* — Mohammed Rachedine
(74) *Attorney, Agent, or Firm* — METIS IP LLC

(57) ABSTRACT

A signal-radiation device utilizes a metal portion of a connection port as a wireless antenna, including an equipment-connecting port, a resonant capacitor and a high frequency isolation inductor required under certain circuit conditions; wherein the equipment-connecting port is disposed with a metal portion, and one end of the resonant capacitor is connected to the metal portion, and another end of the resonant capacitor is electrically connected to an antenna pin of a piece of wireless equipment; the metal portion and the resonant capacitor together form an LC resonant circuit. By adjusting shapes of a metal wire connected to the connection port and adjusting the capacitance of the resonant capacitor, the LC resonant circuit has an LC resonant frequency equal to a wireless operating frequency, wireless signals can be radiated through the metal portion of the equipment-connecting port which is suitable for wireless equipment with very-small-sized equipment-connecting port.

10 Claims, 3 Drawing Sheets

SIGNAL-RADIATION DEVICE UTILIZING METAL PORTION OF CONNECTION PORT AS WIRELESS ANTENNA AND EQUIPMENT THEREOF

CROSS REFERENCE TO RELATED APPLICATION(S)

This non-provisional application claims the benefit under 35 U.S.C. § 119(e) to both of patent application No. 202211375314.0 filed in China on Nov. 4, 2022 and patent application No. 111213168 filed in Taiwan on Nov. 29, 2022, which are hereby incorporated in their entirety by reference into the present application.

BACKGROUND OF THE INVENTION

1. Field of the Invention

The present invention relates to wireless technology, in particular to a signal-radiation device utilizing a metal portion of a connection port as a wireless antenna.

2. Description of the Related Art

Nowadays, wireless communication devices, such as Wi-Fi devices, etc., all need wireless antennas mainly in the following two situations:

1. The antenna is composed of a printed circuit board (abbreviated as PCB herein) which occupies a net area of 1.0 cm×2.5 cm of the PCB. At the same time, there must be a non-metallic casing in the vicinity of the PCB antenna, which requires a larger area of the PCB and a non-metallic signal window.

2. The antenna is a dedicated external antenna which occupies a certain 3D space with a volume typically around 1.0 cm×2.5 cm×1.0 cm, and there must be a non-metallic signal window in the vicinity of the antenna to radiate signals.

The above two antenna structures both put forward requirements on the sizes of the equipment and the materials of the casing, and many ultra-miniature wireless devices cannot meet the above two requirements of antenna structures; as a result, many ultra-miniature wireless devices are not able to effectively radiate wireless signals. Therefore, a very-small-sized device that can realize normal reception/transmission of wireless signals is in demand. Accordingly, the present patent discloses a new technical solution to solve the above deficiencies to meet the demands.

SUMMARY OF THE INVENTION

Regarding the deficiencies of the above-mentioned prior art, the present invention discloses a signal-radiation device utilizing a metal portion of a connection port as a wireless antenna, which radiates wireless signals through a metal portion of a connecting port of a piece of equipment and is suitable for very small-sized wireless type equipment with an equipment-connecting port. The signal-radiation device of the present invention has a simple overall structure without significantly occupying equipment's internal space and a PCB area therein.

In order to fulfill the above purposes, the present invention discloses the following technical solutions:

A signal-radiation device utilizing a metal portion of a connection port as a wireless antenna, including an equipment-connecting port, a resonant capacitor and a high frequency isolation inductor required under certain circuit conditions; wherein the equipment-connecting port is disposed with a metal portion, and one end of the resonant capacitor is connected to the metal portion, and another end of the resonant capacitor is electrically connected to an antenna pin of wireless equipment; the metal portion and the resonant capacitor together form an LC resonant circuit, and the LC resonant circuit has an LC resonant frequency equal to an operation frequency of the wireless antenna.

Preferably, the metal portion is a floating metal portion isolated from the ground.

Preferably, the metal portion is a positive electrode of a DC connecting port connected to an internal circuit of the equipment, and the positive electrode is connected to the internal circuit of the equipment through a high frequency isolation inductor.

Preferably, the metal portion is a negative electrode of a DC connecting port connected to an internal circuit of the equipment, and the negative electrode is connected to the internal circuit of the equipment through a high frequency isolation inductor.

A piece of wireless equipment, including: an equipment body; a wireless chip disposed inside the equipment body, and the aforementioned signal-radiation device; wherein the wireless chip is connected to the metal portion of the equipment-connecting port through the resonant capacitor.

Compared with existing technologies, the present invention has obvious advantages and beneficial effects, specifically:

By connecting a resonant capacitor in series and between a metal portion of an equipment-connecting port and a wireless chip, an LC resonant circuit is formed. When an LC resonant frequency of the LC resonant circuit is equal to a wireless antenna operation frequency, wireless signals can be radiated through the metal portion of the equipment-connecting port which is suitable for wireless equipment with very-small-sized equipment-connecting port; as a result, the overall structure is simple, and does not occupy a lot of internal space of the equipment and corresponding PCB board area therein.

Secondly, through the design of a high frequency isolation inductor, the present invention is also applicable when the metal portion of the equipment-connecting port connects to circuits (e.g. connecting to a positive or negative electrode of original circuits of the equipment) and the wireless signals can be isolated to avoid being absorbed or coupled to the original circuits of the equipment.

DETAILED DESCRIPTION OF THE INVENTION

In the following, the technical solutions in the embodiments of the present invention will be clearly and fully described with reference to the drawings in the embodiments of the present invention. Obviously, the described embodiments are only a part of, not all of, the embodiments of the present invention. Based on the embodiments of the present invention, all other embodiments obtained by a person of ordinary skill in the art without creative efforts shall fall within the protection scope of the present invention.

Figure 1:
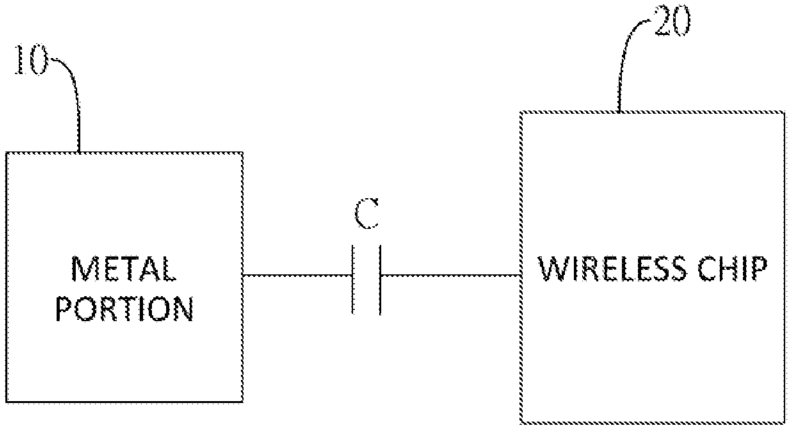
FIG. 1 depicts a device block diagram of an embodiment of the present invention.
Figure 2:
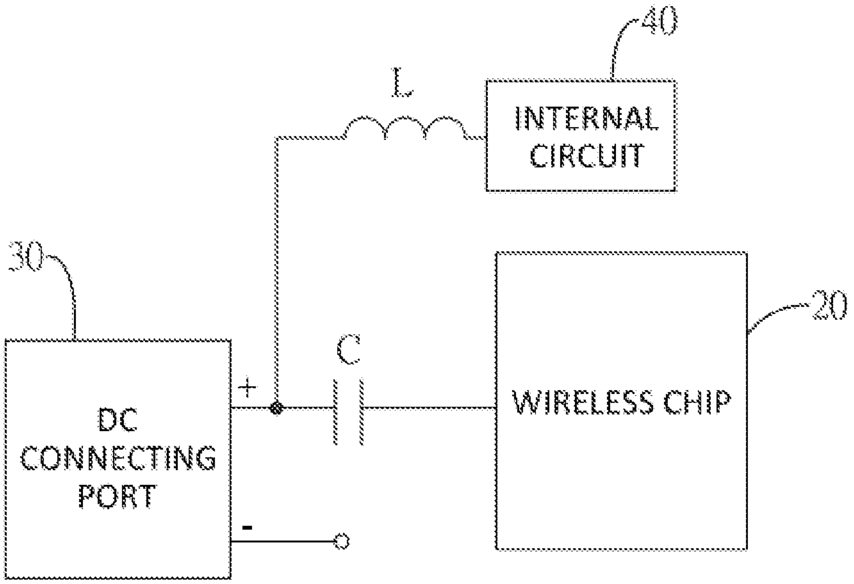
FIG. 2 depicts a block diagram of another embodiment of the present invention.
Figure 3:
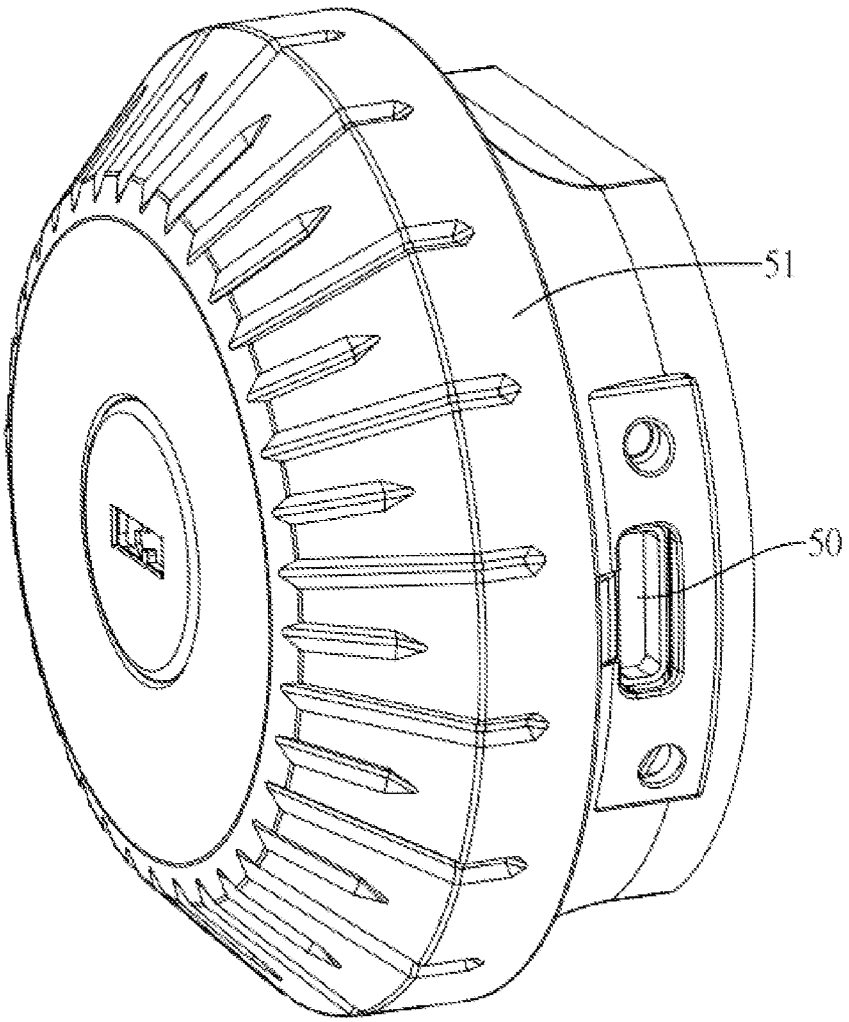
FIG. 3 depicts a wireless equipment structure schematic diagram of an embodiment of the present invention.

As shown in FIGS. 1 to 3, a signal-radiation device utilizing a metal portion of a connection port as a wireless antenna of the present invention includes an equipment-connecting port and a resonant capacitor C, and the signal-radiation device of the present invention can replace various types of wireless antennas including Bluetooth antennas, Wi-Fi antennas, ZigBee antennas, or Lora antennas. In the following, Bluetooth antennas will be used for illustration.

The equipment-connecting port is disposed with a metal portion, and the metal portion has a small equivalent inductance, usually in a nanohenry (nH) magnitude. One end of the resonant capacitor C is connected to the metal portion, and another end of the resonant capacitor C is electrically connected to the wireless chip 20. Considering that the wireless signals are very high frequency signals (for example, between 2.4 GHz-5.8 GHz), an appropriate resonant capacitor C serially connected with a radiation circuit is usually in a picofarad (pF) magnitude. The equipment-connecting port is not limited to USB connecting port, power connection port, HDMI connection port or audio connection port, etc., and as long as the equipment-connecting port has a metal portion exposed to the surroundings, the equipment-connecting port suffices.

The metal portion and the resonant capacitor C together form an LC resonant circuit, and the LC resonant circuit has an LC resonant frequency equal to an operation frequency of a Bluetooth antenna, and since the LC resonant frequency is equal to the operation frequency of the Bluetooth antenna, the wireless signals can be radiated through the metal portion of the equipment-connecting port, which acts as a transmitting radiator of the wireless signals and is not affected by shielding effects of a metal casing of the equipment. Of course, the LC resonant frequency of the LC resonant circuit can also be respectively configured to be equal to an operation frequency of various wireless transmission protocols such as Wi-Fi, ZigBee or Lora.

As shown in FIG. 1, in the present embodiment, the metal portion is a metal portion 10 isolated from the ground. In one embodiment, the equipment-connecting port is a USB connecting port, and the metal portion of the USB connecting port is a metal shell of the USB connecting port, and the metal shell of the USB connecting port has an equivalent inductance about 1 nH. In order to realize a resonant frequency of 2.4 GHz, the supporting resonant capacitor C can be selected as 5 pF, and accordingly, the resonant frequency falls within a range of 2.2 GHz-2.4 GHz, and radiation efficiency is relatively high for the aforesaid configuration according to a field testing that wireless signals can be stably received at a distance of 5 meters from the USB connecting port.

As shown in FIG. 2, in another embodiment, the metal portion is a positive electrode or a negative electrode of a direct current (DC) connection port 30 connected to an internal circuit 40 of the equipment. The positive electrode or the negative electrode is connected to the internal circuit 40 of the equipment through a high frequency isolation inductor L. The internal circuit 40 refers to original circuits in the equipment to realize electrical functions of the equipment. The metal portion (i.e. positive electrode or negative electrode) of an existing DC connecting port 30 must be directly connected to a circuit; therefore, when the metal portion is used as an antenna radiator, problems such as antenna signals being coupled to the internal circuit 40 or being absorbed by the ground, must be considered. Hence, it is necessary to set up an isolation circuit for the internal circuit 40. By exploiting frequency differences between the high frequency of the wireless signals and the direct current or low frequency alternating current of the DC connecting port 30, an appropriate high frequency isolation inductor L is used for series isolation, such that direct current or low-frequency AC can pass through this high frequency isolation inductor L, but ultra-high-frequency wireless signals cannot pass through it; as a result, high-frequency isolation and outward radiation can be achieved only at the metal portion of the DC connecting port 30.

As shown in FIGS. 2 and 3, the present invention proposes a wireless equipment, such as a wireless lock which includes a wireless chip 20, an equipment body 51 and the aforementioned signal-radiation device utilizing a metal portion of a connection port as a wireless antenna. The wireless chip 20 is disposed inside the equipment body 51, and is connected to the metal portion of the equipment-connecting port through a resonant capacitor C. The equipment-connecting port is a USB connecting port 50 disposed on a surface of the equipment body 51, and the metal portion of the equipment-connecting port is the metal shell of the USB connecting port 50.

The main point of the present invention is to connect a resonant capacitor in series and between a metal portion of an equipment-connecting port and a wireless chip to form an LC resonant circuit. When an LC resonant frequency is equal to a wireless antenna operation frequency, wireless signals can be radiated through the metal portion of the equipment-connecting port which is suitable for wireless equipment with a very-small-sized equipment-connecting port; as a result, the overall structure is simple, and does not occupy a lot of internal space of the equipment and corresponding PCB board area therein.

Secondly, through the design of a high frequency isolation inductor, the wireless signals can be isolated to avoid being absorbed or coupled to the original circuits of the equipment.

The aforementioned are preferred embodiments of the present invention. It should be noted that for those of ordinary skill in the art, without departing from the principles of the present invention, certain improvements and retouches of the present invention can still be made, which are nevertheless considered as within the protection scope of the present invention.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A signal-radiation device utilizing a metal portion of a connection port as a wireless antenna, including:

an equipment-connecting port and a resonant capacitor; wherein the equipment-connecting port is disposed with a metal portion, and one end of the resonant capacitor is connected to the metal portion, another end of the resonant capacitor is electrically connected to a wireless chip; the metal portion and the resonant capacitor together form an LC resonant circuit, and the LC resonant circuit has an LC resonant frequency equal to an operation frequency of the wireless antenna.

2. The signal-radiation device as claimed in claim 1, wherein the metal portion is a floating metal portion isolated from the ground.

3. The signal-radiation device as claimed in claim 1, further including:

an internal circuit, wherein the equipment-connecting port is a DC connecting port for connecting with the internal circuit;

the metal portion is a positive electrode of the DC connecting port, and the positive electrode is connected to the internal circuit through a high frequency isolation inductor.

4. The signal-radiation device as claimed in claim 1, further including: an internal circuit, wherein the equipment-connecting port is a DC connecting port for connecting with the internal circuit;

the metal portion is a negative electrode of the DC connecting port, and the negative electrode is connected to the internal circuit through a high frequency isolation inductor.

5. The signal-radiation device as claimed in claim 1, wherein the equipment-connecting port is a USB connecting port, and the metal portion is a metal shell of the USB connecting port.

6. Wireless equipment, including:

an equipment body;

a wireless chip, disposed inside the equipment body; and a signal-radiation device comprising:

an equipment-connecting port and a resonant capacitor; wherein the equipment-connecting port is disposed with a metal portion, and one end of the resonant capacitor is connected to the metal portion, another end of the resonant capacitor is electrically connected to a wireless chip; the metal portion and the resonant capacitor together form an LC resonant circuit, and the LC resonant circuit has an LC resonant frequency equal to an operation frequency of the wireless antenna; and the wireless chip is connected to the metal portion of the equipment-connecting port through the resonant capacitor.

7. The wireless equipment as claimed in claim 6, wherein the metal portion is a floating metal portion isolated from the ground.

8. The wireless equipment as claimed in claim 6, wherein the signal-radiation device further comprises:

an internal circuit, wherein the equipment-connecting port is a DC connecting port for connecting with the internal circuit;

the metal portion is a positive electrode of the DC connecting port, and the positive electrode is connected to the internal circuit through a high frequency isolation inductor.

9. The wireless equipment as claimed in claim 6, wherein the signal-radiation device further comprises:

an internal circuit, wherein the equipment-connecting port is a DC connecting port for connecting with the internal circuit;

the metal portion is a negative electrode of the DC connecting port, and the negative electrode is connected to the internal circuit through a high frequency isolation inductor.

10. The wireless equipment as claimed in claim 6, wherein the equipment-connecting port is a USB connecting port, and the metal portion is a metal shell of the USB connecting port.

* * * * *